United States Patent
Hamman

[11] 3,792,298
[45] Feb. 12, 1974

[54] ELECTRIC MOTOR BRUSH CARD

[75] Inventor: Lyle J. Hamman, Eaton Rapids, Mich.

[73] Assignee: Eaton Stamping Company, Eaton Rapids, Mich.

[22] Filed: Aug. 24, 1972

[21] Appl. No.: 283,525

[52] U.S. Cl. ............................................. 310/242
[51] Int. Cl. ............................................ H02k 13/00
[58] Field of Search ... 310/239, 233, 242, 236, 245, 310/246, 219

[56] References Cited
UNITED STATES PATENTS

| | | | |
|---|---|---|---|
| 3,045,137 | 7/1962 | Simmons | 310/239 |
| 3,654,504 | 4/1972 | Susdorf | 310/239 |
| 3,226,585 | 12/1965 | Roe | 310/239 |
| 3,182,218 | 5/1965 | Videtic | 310/239 |
| 3,493,802 | 2/1970 | Barthruff | 310/239 |
| 2,954,492 | 9/1960 | De Voe | 310/239 |
| 2,630,316 | 3/1953 | Foster | 310/239 |

*Primary Examiner*—R. Skudy
*Attorney, Agent, or Firm*—Beaman & Beaman

[57] ABSTRACT

The invention pertains to electric motor brush structure wherein a planar dielectric support in the form of a card is mounted within a motor housing in a plane perpendicularly disposed to the motor armature axis. A plurality of brush holders are mounted upon the card concentrically arranged about an armature receiving opening defined therein, and the brush holders are of a sheet metal construction of U-cross-sectional configuration having open ends and slots defined in base and leg portions for receiving a brush conductor and portions of a coil tension spring which engages a brush slidably received within each holder for biasing the brush radially inwardly into engagement with the armature commutator.

9 Claims, 6 Drawing Figures

PATENTED FEB 12 1974

3,792,298

ELECTRIC MOTOR BRUSH CARD

REFERENCE TO RELATED APPLICATIONS

The invention pertains to brush holder structure shown in my U. S. Pat. application Ser. No. 283,559, filed Aug. 24, 1972, directed to an electric starter motor.

BACKGROUND OF THE INVENTION

The invention relates to brush holders for electric motors having armatures utilizing commutators.

A wide variety of supporting devices are used to mount and support electric motor brushes wherein the brushes are radially aligned with the armature commutator. Such brush supports may take the form of brackets mounted upon the motor housing, or motor housing end cap. The brush supports may also be in the form of bores or openings defined in the motor housing structure, or in webs formed on the motor housing, and it is usual to mount the brush in its holder such that a compression spring may be interposed between the outer end of the brush, and an abutment member, wherein the spring may exert an inwardly biasing force upon the brush to maintain engagement with the commutator. In many installations, particularly where the brush is mounted within a bore or opening defined on the motor housing structure, a screw type cap or stop, in alignment with the radial movement of the brush axis and brush movement, is utilized as the abutment against which the brush spring bears. Thus, upon removal of the threaded cap or abutment the brush may be replaced without dismantling the motor housing.

While known brush supports and brush mounting devices may provide accessibility for brush replacement, and are capable of adequately supporting the motor brushes, conventional constructions of brush holding devices are relatively expensive in view of the amount of housing material required in the housing type support, and the assembly procedures necessitated during initial motor assembly.

Conventional electric motor brush supporting devices are often troublesome with respect to the replacement of brushes, and the retraction of the brushes during assembly on the armature. Additionally, in small electric motors, particularly where high torques are required, and wherein more than two brushes are employed, conventional brush holder constructions create problems due to the limited space available.

SUMMARY OF THE INVENTION

It is an object of the invention to provide a brush card, and brush holders mounted thereon, for an electric motor wherein a plurality of brushes may be firmly and accurately positioned within an electric motor housing in radial alignment with an armature commutator in an economical and concise manner.

Further, it is an object of the invention to provide an electric motor brush card support, and brush holders, wherein coil tension springs are utilized to bias commutator engaging brushes toward the commutator, yet no auxiliary components such as rivets or pins are required for the support or anchoring of the springs. The brush biasing springs are anchored to projections or tabs lanced from the metallic brush holder itself, and spring receiving slots are defined within sides of the brush holder wherein the spring is capable of exerting a biasing force on the brush during the entire effective life of the brush. The spring receiving slots permit the springs to continue biasing the brush until the brush has been consumed to the point where it is no longer efficiently usable.

The brush holders are mounted upon a dielectric card of synthetic or fibrous material having a central opening formed therein. Brush holders formed of a metal, such as copper, are concentrically mounted on the card about the central opening. The brush holders are mounted to the card by small tabs or projections received within openings defined in the card, and upon deforming the projections or tabs either by a twisting, expanding or bending, the brush holders are firmly attached thereto.

The brush holders are of a generally U-shaped configuration having a base region and parallel leg regions. Upon mounting upon the card the brush holders define a rectangular passage having open inner and outer ends, and the conductive brushes are slidably received within the brush holders for projection therefrom through the inner end. A conductor receiving slot is defined in the brush holder base region for receiving conductors attached to the brushes, and spring receiving slots are defined in the leg regions intersecting the holder outer ends.

A tension spring is anchored upon spring anchors lanced from the brush holder material leg regions adjacent the inner end, and is stretched across the brush holder outer end in alignment with the spring receiving slots formed in the leg regions. Of course, the spring will also engage the outer end of the brush, and thereby bias the associated brush inwardly into operative engagement with the electric motor armature commutator.

Terminals may be mounted upon the brush card to facilitate connection of motor conductors, and as the card is mechanically oriented to the motor housing in a precise manner a plurality of brushes, four in the described embodiment, may be accurately related to the commutator, and concisely arranged in the motor housing. The utilization of the brush card eliminates the necessity for webs or other housing structure to project into the motor housing, permitting the motor housing field to be easily wound and fabricated with a minimum of problems due to the existence of limited clearances and the like if the brush card installation were not employed.

The low cost of construction of the brush card and brush holders, the ability to accurately position the brushes within a concise space, and the utilization of the brush card to minimize interior motor housing structure, permits an electric motor of high torque capability, such as required in an electric starter motor for small internal combustion engines, to be readily produced.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENT

Figure 1:
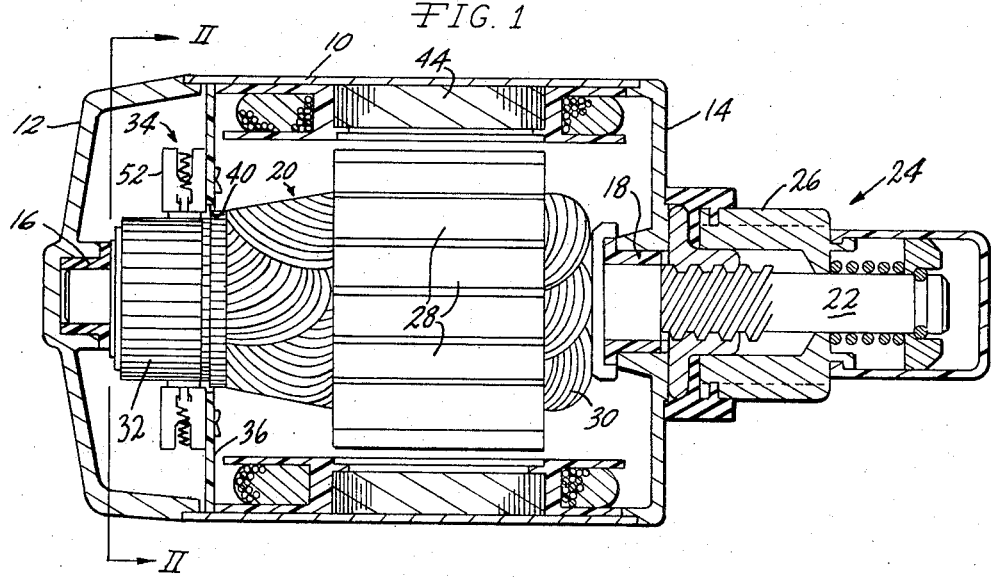
FIG. 1 is a diametrical, elevational, sectional view of an electric motor utilizing a brush card in accord with the invention.

The environment in which the brush card of the invention is utilized will be appreciated from FIG. 1 wherein an electric motor suitable for use as a starter motor for small internal combustion engines is illustrated. Referring to FIG. 1, the electric motor includes a housing 10 having an end cap 12 and an end cap 14. The end caps are mounted upon the housing by tie rods, not shown.

The end cap 12 includes a bearing 16, and the end cap 14 includes a bearing 18 which serves to rotatably support the armature 20 having cylindrical bearing portions rotatably received within the bearings 16 and 18. The armature 20 includes an extension 22 projecting through the end cap 14 upon which engine starter structure 24 is mounted including an engine flywheel engaging gear pinion 26. The motor and starter structure illustrated are described in detail in my copending U. S. Pat. application Ser. No. 283,559, and Ser. No. 283,560 filed Aug. 24, 1972 and form no part of the instant invention.

Tha armature 20 includes poles 28, and coils 30, which may be of conventional form. The coils 30 are electrically connected to the poles or bars of a commutator 32, and the invention is directed to the means for supporting the brushes engaging the commutator, the brush supports, and immediately associated structure.

Figure 2:
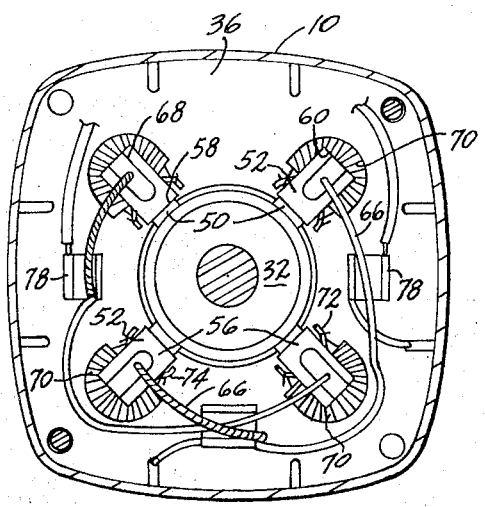
FIG. 2 is an elevational, sectional view of the electric motor of FIG. 1 as taken along Section II—II thereof.

As will be appreciated from FIGS. 1 and 2, the brush structure, generally indicated at 34, is located within the housing 10 adjacent the left end of the housing, FIG. 1, and adjacent the end cap 12. The housing 10 has a cross-sectional configuration which is generally rectangular, however, the sides of the motor housing are somewhat convex, as will be appreciated from FIG. 2. The brush card 36 is of a flat or planar form having a periphery including convex sides 38, which substantially correspond to the configuration of the housing 10, and thus the card 36 may be closely fitted within the housing to engage the inner surfaces thereof, as will be appreciated from FIGS. 1 and 2. The card 36 is formed of a dielectric material, and may be of a fiber construction, or of a synthetic plastic material, or a combination thereof.

Figure 3:
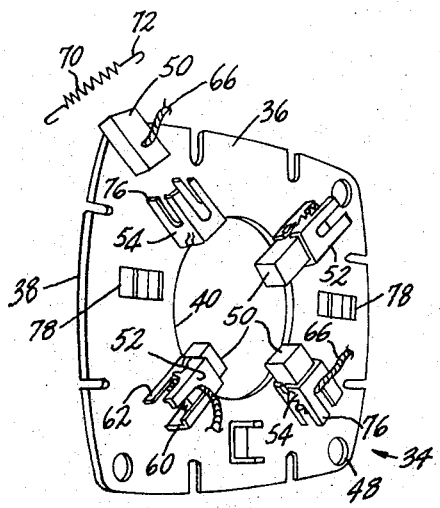
FIG. 3 is a perspective view of a brush card in accord with the invention, one of the brushes, and its associated tension spring, being shown in exploded relationship to its associated brush holder.
Figure 4:
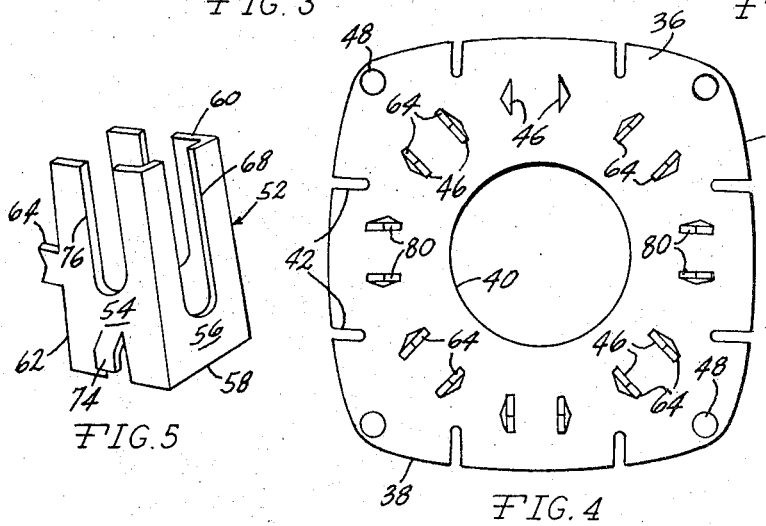
FIG. 4 is an elevational view of the brush card inner side.

The card 36 includes a central opening 40, FIG. 3, of sufficient diameter to receive the armature commutator 32 which is substantially in radial alignment with the card, FIG.1. The outer periphery of the card is provided with a plurality of slots 92 for permitting passage of electrical conductors from the motor field coils generally indicated at 44 to the brush conductors. The card 36 is also provided with a plurality of openings 46, FIG. 4, formed in pairs, and generally concentrically related to the opening 40, for receiving the mounting tabs of the brush holders and terminals mounted upon the card. Also, the card is provided with holes 48 located at the "corners" of the card for permitting the motor housing tie rods to extend therethrough.

Figure 5:
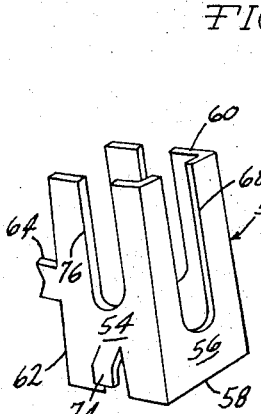
FIG. 5 is an enlarged, detail, perspective view of a brush holder, per se, prior to being mounted on the brush card.
Figure 6:
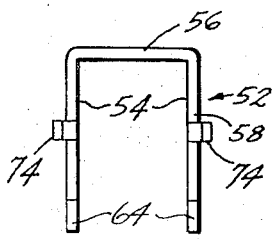
FIG. 6 is an end elevational view of the brush holder shown in FIG. 5.

The motor brushes 50 are mounted upon brush holders 52, four of which are present in the described embodiment. The brush holders 52 are formed of metal, such as copper or plated steel, and are stamped from sheet metal and economically shaped to the U cross section apparent in FIGS. 5 and 6. The configuration of the brush holders 52 includes leg regions 54, a base region 56, an inner edge 58, and outer edge 60, and edges 62 defined along the longitudinal length of the leg regions 54, upon which mounting projections or tabs 64 are formed. The mounting projections or tabs 64 extend through openings 46 defined in the card as will be apparent in FIG. 4, and by expanding, bending or twisting the projections 64 the brush holders 52 may be mounted upon the card 36 in the manner which will be apparent from the drawings such that the inner edge 58 is substantially tangential to the card opening 40.

The brushes 50 are of the usual rectangular cross section having an inner end adapted to engage the commutator 32 in the known manner. The brushes 50 are formed of carbon or graphite, or similar composition, and an electrical conductor 66 extends from the body of the brushes.

A slot 68 is formed in the base region 56 of the brush holders 52 for receiving the brush conductors 66, and as the slot 68 intersects the brush holder edge 60 the brushes may be readily inserted into the brush holder from the outer edge, and as the brush is consumed, and moves radially inward, the slot 68 provides clearance for the conductor 66, and prevents the conductor from interfering with the brush movement.

Inward radial biasing of the brushes 50 is achieved by coil tension springs 70 which pass about the outer ends of the brush holders 52 for engagement with the outer ends of the brushes 50. The hook ends 72 of the springs are anchored to the associated brush holder by means of a pair of tabs 74, a tab being located upon each leg region 54 adjacent the brush holder inner edge 58. The tabs 74 are lanced from the leg portion material, and deflected outwardly from the associated leg region, FIGS. 5 and 6, to permit the spring ends 72 to be easily attached thereto.

In order that the springs 70 may effectively engage the outer end of the brushes 50 as the brushes are consumed and move further radially inward of the brush holder, the leg regions 54 are each slotted at 76, such that the slots 76 intersect the brush holder outer edge 60, and are of sufficient dimension to laterally receive the springs 70. Thus, as the brushes move inwardly, the slots 76 permit the springs 70 to engage and bias the brushes until the brushes are substantially consumed.

If desired, terminals 78, FIGS. 2 and 3, may be mounted upon the card 36 intermediate the brush holders, such terminals taking the form of a U member having projections 80 extending therefrom for receipt within card openings 46 and upon deformation of the projections 80 the terminals 78 will be affixed to the brush card. As will be apparent in FIG. 2, the terminals 78 may be used to receive field conductors, or armature conductors, in establishing the desired electrical connections between the motor field and brushes.

In the assembly of the motor it is apparent that the field coils 44 may be readily wound without interference by the brush support structure in that the card 36 is not in place, and is not located within the housing, until after manufacture of the housing, and its field, is completed. Assembly of the brush card to the housing is simplified in that the card merely need by inserted into the motor housing, yet is accurately positioned therein due to the close interfit with the housing configuration. The terminals 78 permit the field and brush conductors to be readily attached to the card and brushes, and the brush conductors may also be in contact with selected terminals mounted upon the card. The card slots 42 permit the card to be inserted in place without interfering with the field conductors, as the field conductors may be received within these slots.

In assembly, the brushes 50 are usually biased outwardly to provide clearance for receiving the armature by the fitting of a cone shaped brush retractor temporarily mounted upon the armature bearing received in bearing 16. Thus, it is possible to install the springs 70 upon the brush holders 52 prior to the insertion of the brush card within the housing. As soon as the commutator 32 is in alignment with the brush holders 52 the springs 70 will bias the brushes into engagement with the commutator, and maintain this engagement during operation of the motor.

Should replacement of a brush, or a spring become necessary, such maintenance can be easily accomplished upon removal of the end cap 12, and no special skills or tools are required for such brush replacement.

In view of the economical construction of the brush card, and the stamped brush holders 52, it will be appreciated that the brush card, brush holders, and other associated structure may be very economically manufactured, and yet four brush holders may be readily located upon the card in a concise manner such that the dimension of the motor may be kept to a minimum, and yet sufficient torque produced to meet the requirements of an electric starter motor. The fact that the coil springs 70 are anchored to tabs 24 formed on the brush holders themselves minimizes the number of components mounted on the card 36 and permits a "clean" installation which is concise and dependable in operation.

It is appreciated that various modifications to the inventive concept may be apparent to those skilled in the art without departing from the spirit of the invention.

I claim:

1. A brush holder for an electric motor adapted to be mounted on a dielectric support comprising a U-shaped body having a longitudinal axis, a base region, a pair of substantially parallel leg regions, an inner end edge, an outer end edge and supporting lateral edges defining the end of said leg regions in a circumferential direction, a conductor receiving slot defined in said base region intersecting said outer edge, identical elongated spring receiving slots defined in each of said leg regions intersecting said outer edge, tension coil spring anchor means defined on each of said leg regions adjacent said inner edge and in alignment with the spring receiving slot defined on the associated leg region, and mounting means defined on said leg regions extending from said lateral edges.

2. In a brush holder as in claim 1 wherein said spring anchor means comprises a tab lanced from each leg region adjacent said leg region's inner edge.

3. In a brush holder as in claim 1, a tension coil spring having ends each attached to a spring anchor means, said spring adapted to extend over said body outer end edge in alignment with siad spring receiving slots.

4. A brush holder for electric motors comprising, in combination, a planar card of dielectric material having a central armature receiving opening defined therein having an axis, a plurality of brush holders mounted on said card adjacent said opening and concentrically arranged relative to said axis, said brush holders each comprising a metal U-shaped body having a longitudinal axis, a base region, a pair of substantially parallel leg regions, an inner end edge, an outer end edge and supporting lateral edges defining the end of said leg regions in a circumferential direction, a conductor receiving slot defined in said base region intersecting said outer edge, a spring receiving slot defined in each of said leg regions intersecting said outer edge, spring anchor means defined on said leg regions adjacent said inner edge, a deformable mounting projection extending from each of said leg region lateral edges extending through said card, an electrical brush slidably mounted in each brush holder body, a tension spring mounted on each body having an end attached to each leg region by said anchor means and extending over said outer edge and in alignment with said spring receiving slots, said springs engaging the associated brush biasing said brush toward said axis, and a conductor attached to each brush extending through said conductor receiving slot.

5. In a brush holder as in claim 4 wherein said spring anchor means comprises a tab lanced from each leg region adjacent said leg region's inner edge.

6. In a brush holder as in claim 4 wherein said conductor and spring receiving slots are substantially parallel to said body axis.

7. In a brush holder as in claim 4 wherein a plurality of openings are defined in said card concentric to said central opening axis, said mounting projections being received within said openings.

8. In a brush holder as in claim 4 wherein at least one brush terminal is mounted on said card.

9. A brush holder for an electric motor adapted to be mounted on a dielectric support comprising a U-shaped body having a longitudinal axis, a base region, a pair of substantially parallel leg regions, an inner end edge, an outer end edge and supporting lateral edges defining the end of said leg regions in a circumferential direction, a spring receiving slot defined in each of said leg regions intersecting said outer edge, spring anchor means defined on said leg regions adjacent said inner edge, a brush slidably received within said body having an outer end disposed toward said outer edge, a flexible tension coil spring tensioned over said brush outer end in engagement therewith and in alignment with said spring receiving slots biasing said brush toward said inner edge, said spring having ends attached to said spring anchor means, and mounting means defined on said leg regions extending from said lateral edges.

* * * * *